July 24, 1934.   H. WÖRNER   1,967,344
ROTARY SHOCK ABSORBER FOR POWER DRIVEN VEHICLES
Filed May 9, 1932
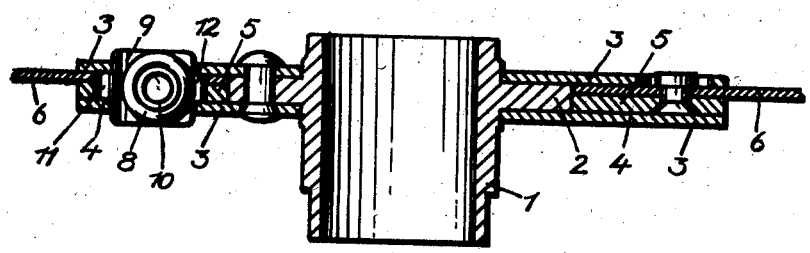
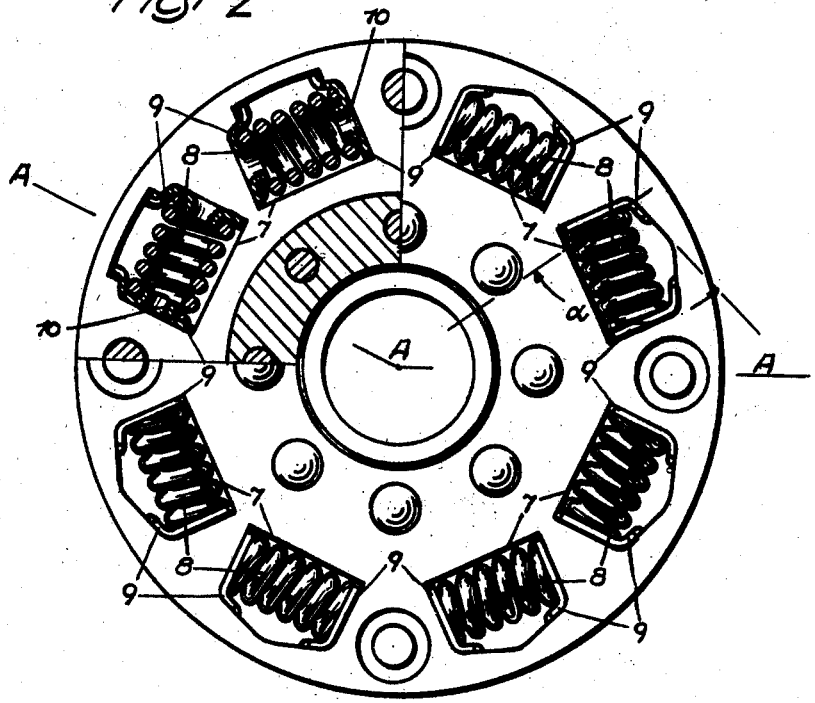
H. Wörner
INVENTOR
By Marks & Clerk
Attys.

Patented July 24, 1934

1,967,344

UNITED STATES PATENT OFFICE 1,967,344

ROTARY SHOCK ABSORBER FOR POWER DRIVEN VEHICLES

Heinrich Wörner, Bischofsheim, Germany, assignor to Fichtel & Sachs A. G., Schweinfurt-on-the-Main, Germany, and Mecano G. m. b. H., Frankfort-on-the-Main, Germany Application May 9, 1932, Serial No. 610,180
In Germany February 24, 1931

1 Claim. (Cl. 64—100)

This invention relates to rotary shock absorbers in which shocks and counter shocks acting in the direction of rotation and originating, for example, in the driving engine are taken up and equalized by two concentric rings which can be resiliently rotated relative to one another. The advantage of the present improvement over the known devices consists in that the helical springs employed for equalizing the shocks are mounted in a special, secure and permanent manner. In this way the constant rubbing of the springs during their operation and the consequences of the considerable centrifugal forces acting on the springs at the same time are effectively met.

The accompanying drawing illustrates the invention in combination with a two-part clutch disc in the form which is used in clutches for power driven vehicles.

Fig. 1 shows a cross-section on the line A of Fig. 2, and

Fig. 2 is an elevation partly in longitudinal section.

The clutch disc consists in a known manner of the nave 1 with annular flange 2, to which is secured on each side an annular disc 3, for example by riveting. In this way a deep annular groove 4 is formed in which the clutch disc 6, which is riveted to a lining ring 5 (partly visible in Fig. 1 but not shown in Fig. 2), is rotatable. This disc, as well as the discs 3, is provided with recesses 7 which coincide and in which the helical springs 8 are placed. The rotary shocks which are to be absorbed have the effect of turning the discs 3 and the clutch disc 6 in opposite directions so that the springs 8 are tensioned. The shocks are damped by these and the following return movement of the parts 3 and 6.

The present invention consists in the construction and mounting of the bearing plates 9 against which the ends of the helical springs 8 bear. The plates 9 lie in pairs parallel to the side edges in the recesses 7 of the disc 3 and the discs 5, 6. In the middle of the plates 9, a short support 10 of sleeve-like construction is bent up, and on the upper and lower sides tongues 11 and 12 are cut out by means of which the plates 9 engage in the annular groove 4 and are prevented from turning. The outwardly directed tongues 12 are bent double and the recesses 12 at the corresponding sides are shaped to suit these bent parts. The angle $\alpha$ between a diameter and the adjoining side of the recess is therefore greater than 90°. In the recesses 7 the helical springs 8 are placed between each two supporting plates 9 and their end turns embrace tightly the supports 10. By this mode of arrangement the rubbing of the ends of the springs on the bearing surfaces during the operation of the shock absorber is prevented, and, in particular, on account of the size of the angle $\alpha$ the result is obtained that during the relative movement of the discs 3 and 5, 6 and the alternate lifting from the bearing plates 9 no friction can occur between the plates and the adjacent edges of the recesses, which, in view of the considerable centrifugal forces acting there, would lead to rapid wear of the rubbing surfaces.

What I claim is:

A rotary shock absorber for power-driven vehicles comprising a hub, two parallel discs secured thereto, a concentric annular plate disposed in the groove formed by the two discs and rotatable relative thereto, the plate and discs each having a number of recesses arranged in a circle opposite one another, shock absorbing springs mounted in the recesses, bearing plates arranged in pairs in the recesses of the discs, sleeve-like abutments in the middle of the bearing plates which are closely surrounded by the end turns of the springs, and tongues cut out of the bearing plates on the inside and the outside, the outer tongues being bent in an angle of more than 90° between a diameter and the adjoining side of a recess.

HEINRICH WÖRNER.